United States Patent [19]

Stapleton

[11] Patent Number: 5,791,536
[45] Date of Patent: Aug. 11, 1998

[54] ARTICLE CARRIER ASSEMBLY

[75] Inventor: Craig Stapleton, Clarkston, Mich.

[73] Assignee: Advanced Accessory Systems LLC, Sterling Heights, Mich.

[21] Appl. No.: 683,193

[22] Filed: Jul. 18, 1996

[51] Int. Cl.[6] .................................................. B60R 9/04
[52] U.S. Cl. ......................................... 224/321; 224/326
[58] Field of Search .................................... 224/321, 326

[56] References Cited

U.S. PATENT DOCUMENTS

| | | | |
|---|---|---|---|
| 4,406,386 | 9/1983 | Rasor et al. | 224/321 |
| 4,911,348 | 3/1990 | Rasor et al. | 224/321 |
| 5,190,198 | 3/1993 | Cucheran | 224/321 |
| 5,385,284 | 1/1995 | Bott | 224/321 |
| 5,577,650 | 11/1996 | Stapleton | 224/321 |
| 5,588,572 | 12/1996 | Cronce et al. | 224/321 |

*Primary Examiner*—Renee S. Luebke
*Attorney, Agent, or Firm*—Rader, Fishman & Grauer PLLC

[57] ABSTRACT

An article carrier assembly is partially recessed into a recessed roof panel joint channel. The article carrier assembly side rail is attachable to the vehicle roof panel, and includes a track and an outboard corner portion. A retainer includes a foot portion slidably disposed within the track for supporting the retainer on the side rails. A latch comprises a lever pivotally connected to the retainer for indexing the retainer at discrete positions along the side rail. A trim rail pad is secured with respect to the side rail, and extends from the outboard corner portion into the joint channel in a manner to substantially hide the side rail therebehind when viewed from a position alongside the vehicle. Alternative embodiments for the trim rail pad and latch are provided.

4 Claims, 5 Drawing Sheets

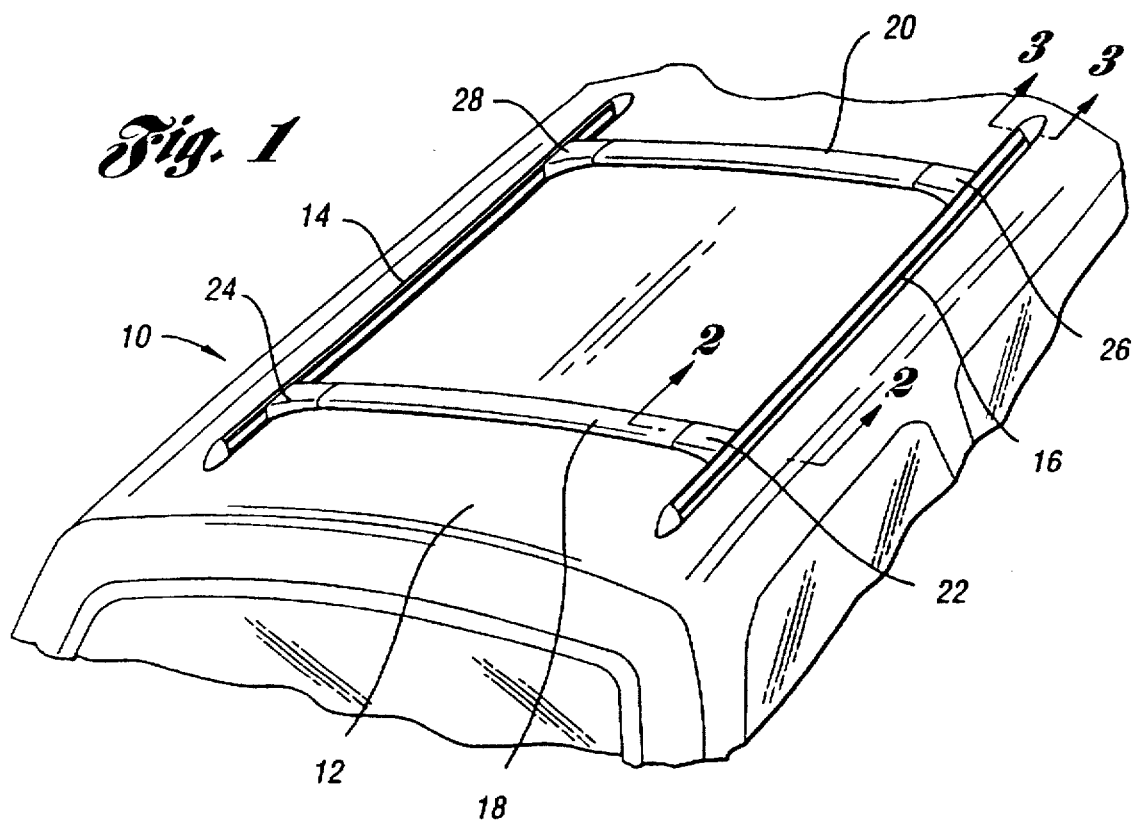

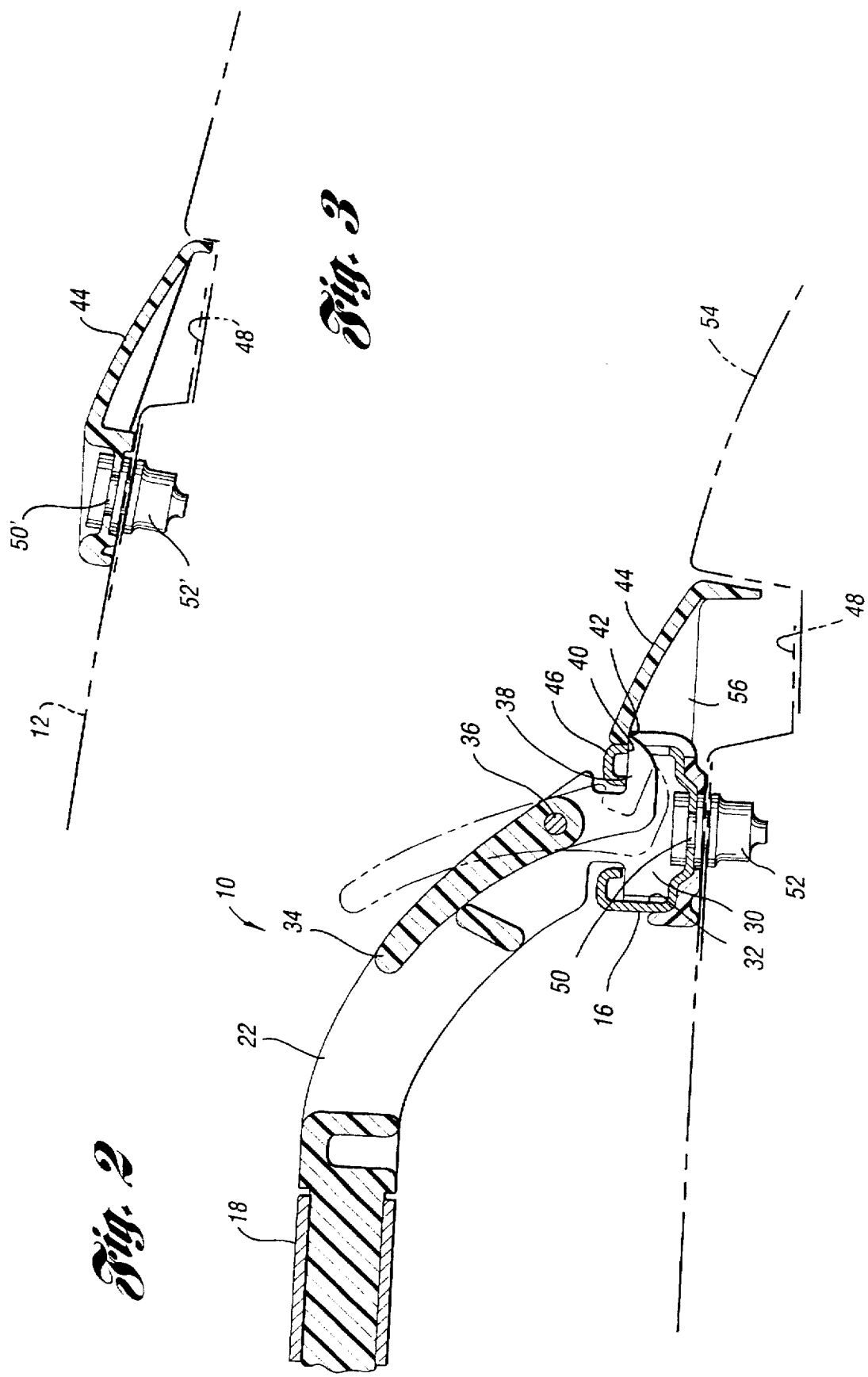

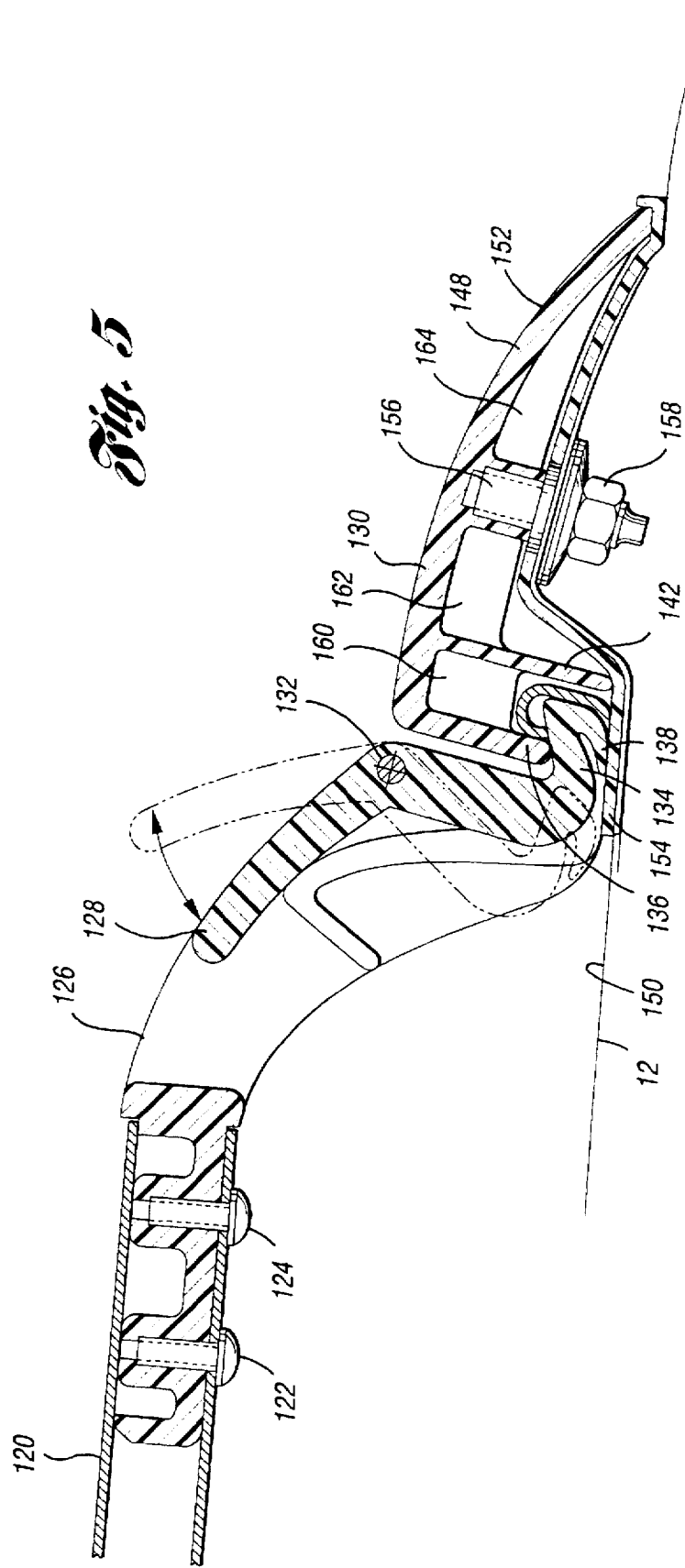

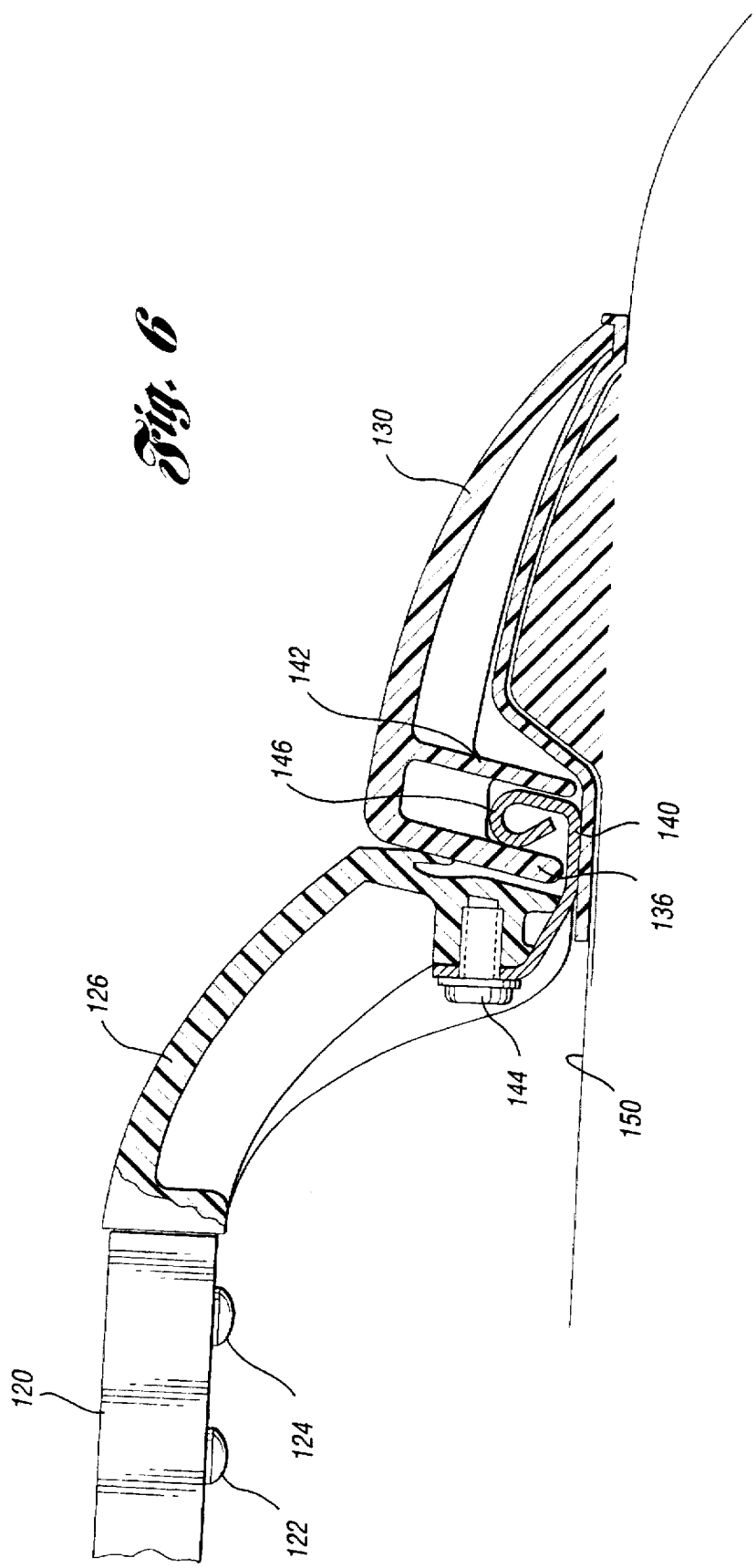

ARTICLE CARRIER ASSEMBLY

TECHNICAL FIELD

The present invention relates to an article carrier assembly for a vehicle roof, and more particularly to an article carrier assembly with improved styling and noise damping features.

BACKGROUND OF THE INVENTION

Typical vehicle article carrier assemblies include a pair of side rails mounted to the vehicle with at least one cross rail extending therebetween. Retainers on opposing ends of the cross rail attach the cross rail to the side rails. The retainers are usually secured to the side rails by latches or other such mechanisms. The retainers, cross rails and latches create design problems in that such components may be bulky, and it is difficult to combine trim styling with sufficient strength for supporting the article carrier assembly.

The article carrier assembly side rails are often too bulky to complement the vehicle styling as a result of strength requirements, and attempts to design the side rails with complementary styling are discouraged as a result of expected loss of article carrier structural integrity. It is difficult to provide cross rails in the form of a trim rail for styling purposes without sacrificing structural integrity. In addition, load bearing contact of the crossbars upon the side rails can abrade the exterior surface finish of the side rails.

DISCLOSURE OF THE INVENTION

The present invention overcomes the above-referenced shortcomings of prior art article carrier assemblies by providing trim rail type side rail assemblies that provide styling features capable of complementing vehicle styling while maintaining strength and smooth operation particularly between adjacent structures of the assembly. The carrier assemblies include components which are recessed into the roof panel joint channel for improved styling. Also, in order to maintain a sound assembly with the improved styling, built-in spring standoff tabs are provided on the retainer to eliminate rattles between the retainer and the side rail. In addition, the construction avoids abrasive contact between crossbars and the finished, exterior surface of the styled side rail.

A preferred embodiment provides an article carrier assembly for attachment to a vehicle roof panel having a recessed roof panel joint channel. The side rail is attachable to the vehicle roof panel. The side rail includes a track and has an outboard corner portion. A retainer includes a foot portion slidably disposed within the track for supporting a retainer on the side rail. A latch comprises a lever pivotally connected to the retainer for indexing the retainer at discrete positions along the side rail. A trim rail pad is secured with respect to the side rail, and extends from the outboard corner portion into the joint channel in a manner to substantially hide the side rail therebehind when viewed from a position alongside the vehicle.

An alternative embodiment provides an article carrier assembly with a trim rail pad secured with respect to the side rail, the trim rail pad having a leg portion extending into the roof panel joint channel. A first portion of the trim rail pad is positioned between the side rail and the roof panel, and a second portion extends from the corner portion of the side rail to the roof panel in a manner to substantially hide the side rail therebehind when viewed from a position alongside the vehicle.

Another embodiment provides an article carrier assembly attachable to a recessed portion of the vehicle roof panel. The side rail includes an outboard portion extending away from the recessed portion and having an outer surface, and an inboard portion extending into the recessed portion. The inboard portion includes a support leg and an edge portion. The retainer includes a latch for engagement with the edge portion for securing the stanchion along the side rail. The inboard portion and edge portion are substantially hidden behind the outer surface when viewed from a position alongside the vehicle.

Accordingly, an object of the present invention is to provide an article carrier assembly in which a trim rail or pad is at least partially recessed into a roof panel joint channel for improved styling and strength.

Another object of the present invention is to provide an article carrier assembly in which a trim rail is at least partially recessed into a roof panel joint channel, and the retainer includes built-in spring standoff tabs to maintain smooth operation and reduce rattle in the assembly.

A further object of the present invention is to provide an article carrier assembly in which a major portion of the retainer is hidden behind a trim rail which is partially recessed into a roof panel joint channel. In addition, the invention provides a strong metal insert retainer in a stylized body to form a two-piece stylized side rail. Moreover, the present invention avoids contact with the exposed finish surfaces of the trim side rail.

BRIEF DESCRIPTION OF THE DRAWINGS

The above objects and other objects, features and advantages of the present invention are readily apparent from the following detailed description of the best modes for carrying out the invention when read in connection with the accompanying drawings in which like reference characters refer to like parts throughout the views, and in which:

FIG. 1 shows a cut-away environmental perspective view of an article carrier assembly secured to a vehicle roof in accordance with the present invention;

FIG. 2 shows a vertical cross-section of a preferred embodiment of an article carrier assembly taken at line 2—2 of FIG. 1;

FIG. 3 shows a vertical cross-section of an article carrier side rail taken at line 3—3 of FIG. 1 in accordance with the present invention;

FIG. 5 shows a vertical cross-section of yet another alternative embodiment of an article carrier assembly In accordance with the present invention taken at line 2—2 of FIG. 1; and FIG. 6 shows a vertical cross-section of the retainer and side rail in accordance with the embodiment shown in FIG. 5.

DETAILED DESCRIPTION OF THE PREFERRED EMBODIMENTS

Figure 4:
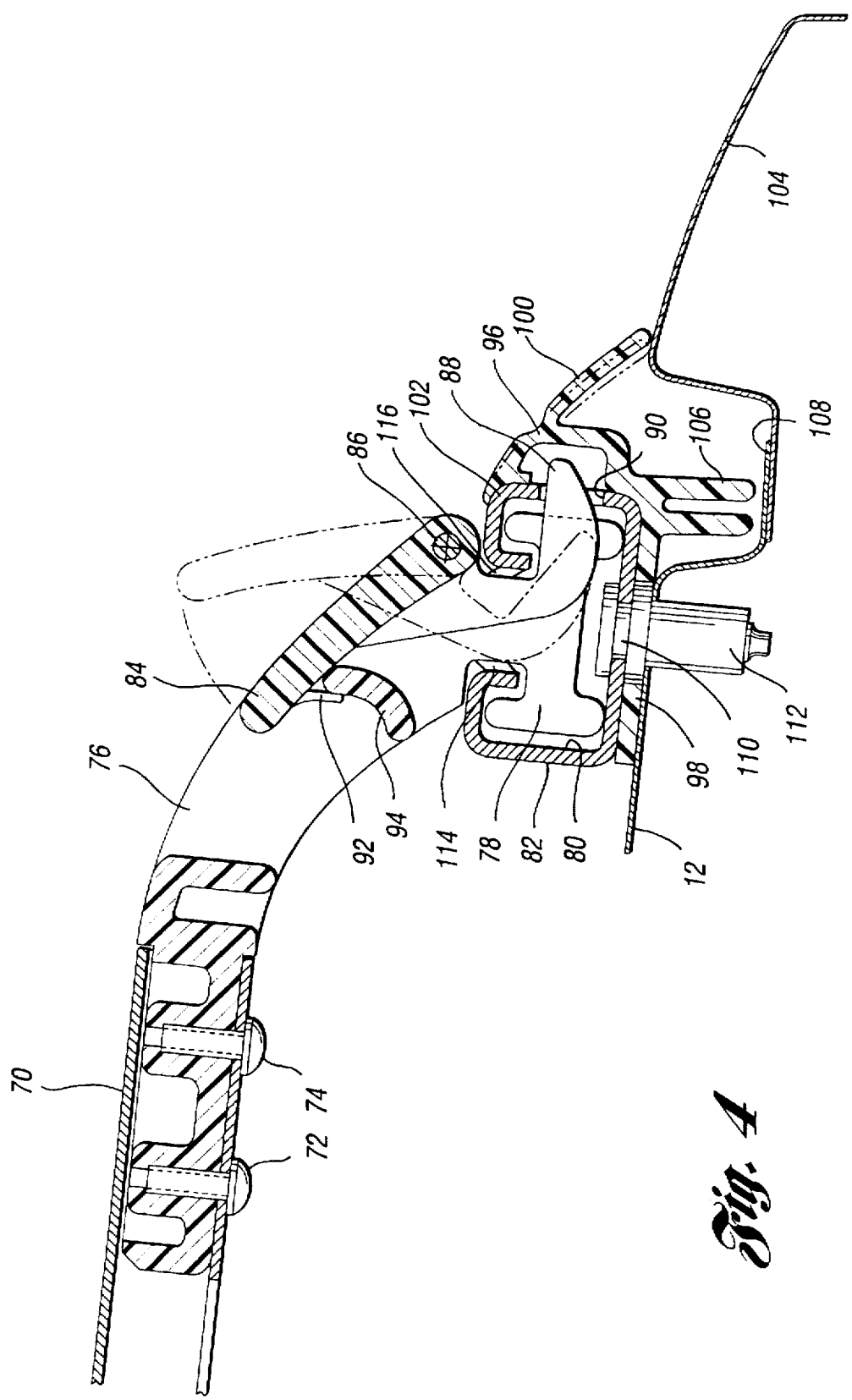
FIG. 4 shows a vertical cross-section of an alternative embodiment of an article carrier assembly in accordance with the present invention taken at line 2—2 of FIG. 1.

FIG. 1 shows a cut-away environmental perspective view of an article carrier assembly 10 secured to a vehicle roof 12 in accordance with the present invention. The article carrier assembly 10 includes first and second side rails 14,16 attached to the vehicle roof. First and second cross rails 18,20 extend across the vehicle roof 12 for carrying articles thereon. The cross rails 18,20 are secured to the side rails 14,16 by the respective retainers 22,24,26 and 28.

Turning to FIGS. 2 and 3, a preferred embodiment of a side rail 16, cross rail 18, and retainer 22 is shown attached to the vehicle roof 12. The article carrier assembly 10 includes a cross rail 18, preferably in the form of a tube, secured to a retainer 22. Retainer 22 has a body with an end received in the cross rail and has a foot portion 30. The body may rise upwardly above the roof 12 depending upon the style to be employed. The foot 30 is slidably disposed within the elongate channel 32 formed by a metal insert in the side rail 16. The insert of side rail 16 is preferably a roll-formed aluminum component, and fits within a trim rail pad 44 to form the side rail 16. The pad is preferably a thermoplastic olefin (TPO) material but can be made of a wide variety of materials.

A latch lever 34 is pivotally secured to the retainer 22 at the press pin 36. A torsion spring (not shown) biases the hook portion 38 of the latch lever 34 toward a position of engagement with the apertures 40,42 formed in the metal insert of the side rail 16 and the trim rail pad 44, respectively, for securing the retainer 22 in discrete positions along the side rail 16.

The trim rail pad 44 extends from the outboard corner portion 46 of the metal insert of side rail 16 into the roof panel joint channel 48. The trim rail pad 44 also extends oppositely from the outboard corner portion 46 between the side rail 16 and roof panel 12. A plurality of screws 50 and rivet nuts 52 secure the metal insert of the side rail 16 and the trim rail pad 44 along the roof panel 12.

In order to index the cross rail and retainer 22 along the roof panel, the lever 34 is rotated to the position shown in phantom in FIG. 2 to disengage the hook portion 38 of the lever 34 from the respective apertures 40,42, and the retainer 22 and foot portion 30 may then be slid longitudinally along the elongate channel 32 of the side rail 16 Once the cross rail 18 and retainer 22 have been moved to a desired position along the side rail 16, the lever 34 is returned to the engaged position wherein the hook portion 38 engages a respective pair of apertures 40,42 formed along the side rail 16 and trim rail pad 44.

The trim rail pad 44 is partially recessed into the roof panel joint channel 48 and extends oppositely to the outboard corner portion 46 in a manner to substantially hide the side rail 16 therebehind when viewed from a position alongside the vehicle. Furthermore, the trim rail pad 44 acts to blend the contour of the retainer 22 and side roof panel 54 together for improved styling. A plurality of support ribs 56 are provided along the length of the trim rail pad 44 for structural support.

Referring to FIG. 3, a sectional view along line 3—3 of FIG. 1, it is shown that the trim rail pad 44 substantially blends into the contour of the vehicle roof panel 12 at its longitudinal ends for enhanced styling. Screw 50' and rivet nuts 52' are shown securing the trim rail pad 44 to the vehicle roof panel 12.

An alternative embodiment of the article carrier assembly is shown in FIG. 4 in accordance with the present invention. This embodiment provides a cross rail 70 attached by screws 72,74 to the retainer 76. The retainer 76 includes a foot portion 78 slidably disposed within the elongate channel 80 formed by the side rail 82. The side rail 82, preferably a roll-formed aluminum component, is received in a trim rail pad 96.

For indexing the retainer 76 along the side rail 82, a latch 84 is pivotally mounted to the retainer 76 at the press pin 86. The latch 84 includes a hook portion 88 engagable within the plurality of apertures 90 formed along the insert of the side rail 82. In order to secure the latch 84 in an engaged position, a detent 92 is provided for engaging the stop 94 of the retainer 76. In order to move the retainer 76 along the side rail 82, the latch 84 is pivoted to the position shown in phantom in FIG. 4 in which the hook portion 88 is disengaged from the respective aperture 90. The foot portion 78 of the retainer 76 is then slid along the elongate channel 80 of the side rail 82 for selective adjustment along the side rail 82.

The trim rail pad 96 has a first flange portion 98 positioned between the insert of the side rail 82 and the roof panel 12, and a second portion 100 extending from the corner portion 102 of the side rail 82 to the roof panel 104 in a manner to substantially hide the insert of the side rail 82 therebehind when viewed from a position alongside the vehicle. The trim rail pad 96 further includes a leg portion 106 extending into the roof panel joint channel 108. A screw 110 and rivet nuts 112 secure the insert of the side rail 82 and the trim rail pad 96 to the vehicle roof 12. The retainer 76 further includes a pair of built-in spring stand off tabs 114,116 which engage the side rail 82 in a manner to prevent rattles.

Another alternative embodiment of the present invention is shown in FIGS. 5–6. This embodiment provides a cross rail 120, preferably a tube, receiving an end of the body of the retainer 126 and secured by screws 122,124 to the retainer 126. The retainer 126 includes a latch 128 for indexing the retainer 126 along the side rail 130.

The latch 128 has a lever pivotally secured to the retainer 126 at the press pin 132, and is spring biased toward a position of engagement with the insert of the side rail 130. The latch 128 includes a hook portion 134, preferably made in one piece with the lever, which is engagable with the edge portion 136 of the insert of the side rail 130 for securing the retainer 126 in a desired position. The hook portion 134 of the latch 128 includes a built-in spring portion 138 on the bottom surface thereof for forcing the hook portion 134 against the edge portion 136 of the trim rail 130 when the lever is in the locked position.

To disengage the hook portion 134 of the latch 128 from the edge portion 136 of the side rail 130, the lever is rotated about the press pin 132 to the position shown in phantom in FIG. 5. In this position, the retainer 126 and cross rail 120 may be slid longitudinally along the vehicle roof 12 in order to adjust the cross rail 120 to a desired position along the roof 12.

The retainer 126 further includes a foot 140, which preferably comprises a metal stamping having a loop portion extending into a channel between the edge portion 136 of the side rail 130 and the support leg 142 of the side rail 130 forming a track. The foot 140 is secured to the retainer 126 by the attachment screw 144. The loop portion 146 of the foot 140 prevents removal of the retainer 126 from the track to restrict removal of the crossbar from the side rail on the vehicle roof. The loop portion 146 compressibly engages the peripheral wall of a channel, for example, as shown at the edge portion 136, in a manner to prevent rattles.

The side rail 130 further includes an outboard portion 148 extending away from the recessed portion 150 of the vehicle roof 12. In this configuration the hook portion 134, edge portion 136, and support leg 142 are substantially hidden behind the outer surface 152 of the outboard portion 148 of the side rail 130 when viewed from a position alongside the vehicle. A gasket 154 is positioned between the side rail 130 and the roof panel 12, and the side rail 130 and gasket 154 are secured to the roof panel 12 by the attachment screw 156 and nut 158.

Stiffener ribs 160,162,164 are provided for structurally supporting the edge portion 136, support leg 142, and outboard portion 148 of the side rail 130.

The support leg 142 and edge portion 136 are recessed into the recessed portion 150 of the vehicle roof panel 12 for styling reasons. In this configuration, the contour of the side rail 130 and retainer 126 complement the styling of the vehicle, particularly with a substantial portion of the latch 128 and trim rail 130 being recessed into the recessed portion 150 of the vehicle roof panel 12. Nevertheless, the exposed exterior surface 152 is not contacted by the retainer and is not abraded by movement of the cross rail.

While the best modes for carrying out the invention have been described in detail, those familiar with the art to which this invention relates will recognize various alternative designs and embodiments for practicing the invention within the scope of the appended claims. For example, while the side rails of the preferred embodiment exhibit a flush fit with the vehicle body, a raised or heightened body for the side rail could also be constructed according to the present invention.

What is claimed is:

1. An article carrier assembly for attachment to a vehicle roof panel having a recessed roof panel joint channel, the article carrier assembly comprising:

a side rail attachable to the vehicle roof panel above the joint channel including a track and an outboard corner portion, said outboard portion including a first plurality of indexing holes formed therealong at discrete positions;

a trim rail pad including a leg portion extending into said joint channel, a first flange portion positioned between said side rail and the vehicle roof panel, a second portion extending from said outboard corner portion to the vehicle roof panel in a manner to substantially hide the side rail track therebehind when viewed from a position alongside the vehicle;

a retainer supporting a cross rail on said side rail, said retainer including a foot portion slidably disposed within said track; and a latch connected to said retainer for securing said retainer in discrete positions along said side rail, said latch including a hook lever pivotally secured to said retainer for engagement with said first indexing holes;

wherein said side rail is directly attached to the vehicle roof panel through said first flange portion.

2. The article carrier assembly of claim 1, wherein said side rail is comprised of roll-formed aluminum, and said track is an elongate channel formed in said side rail.

3. The article carrier assembly of claim 1, wherein said retainer further comprises a plurality of built-in spring standoff tabs for engagement with said side rail to prevent rattles.

4. An article carrier assembly for attachment to a vehicle roof panel having a recessed roof panel joint channel, the article carrier assembly comprising:

a side rail attachable to the vehicle roof panel above the joint channel including a track and an outboard portion, said outboard portion including a first plurality of indexing holes formed therealong at discrete positions;

a trim rail pad including a first flange portion positioned between said side rail and the vehicle roof panel, a second portion extending from said outboard portion across the joint channel to the vehicle roof panel in a manner to substantially hide the side rail therebehind when viewed from a position alongside the vehicle;

a retainer supporting a cross rail on said side rail, said retainer including a foot portion slidably disposed within said track; and a latch connected to said retainer for securing said retainer in discrete positions along said track, said latch including a hook lever pivotally secured to said retainer for engagement with said first indexing holes;

wherein said side rail is directly attached to the vehicle roof panel through said first flange portion.

* * * * *